Patented July 6, 1926.

1,591,798

UNITED STATES PATENT OFFICE.

GEORGE S. TILLEY, OF BERKELEY, CALIFORNIA.

PROCESS OF TREATING ALUNITE.

No Drawing.   Application filed May 20, 1924.   Serial No. 714,739.

The present invention relates to the treatment of alunite, which as well known, is a mineral somewhat related to alum, in that it contains a basic double sulfate of potassium and aluminum but the material is different from alum in that it is not soluble in water, and furthermore this material is not very readily acted upon by dilute acids, tc convert the same into soluble compound.

Various processes have heretofore been proposed, for treating alunite, for the production of alum, aluminum sulfate, potassium sulfate, alumina and other products therefrom, but these processes, as heretofore proposed, have left much to be desired, and the object of the present invention is to convert substantially the entire amount of potassium and aluminum present into soluble compounds, so that iron-free alum and aluminum sulfate can be directly prepared from the mother liquors. None of the old processes give as a result the iron-free aluminum compounds desirable in the manufacture of iron-free aluminum compounds and absolutely indispensable for the manufacture of metallic aluminum, and the object of the present invention is to convert substantially the entire amount of potassium and aluminum present into soluble compounds which are iron-free as no other process prepares therefrom alunite.

In a preferred form of execution of my process, I first grind the alunite, in a suitable mill, to a fine powder preferably so that the whole or substantially the whole of the material will pass through a screen having about 80 meshes per linear inch. I then mix the powdered alunite with sulfuric acid, preferably of about 20% strength, and in this operation, I preferably use, for each 100 pounds of alunite, about 50—60 pounds of the sulfuric acid of the strength mentioned. I then heat the mixture to a temperature of about 85 to 90° C., this operation being performed at atmospheric pressure, and preferably in a vessel provided with a reflux condenser, in order to prevent any substantial concentration of the mixture during this heating or digesting period. It is preferable to continue the digestion for about 24 to 48 hours, at the temperature mentioned, and at the end of that time it will be found that substantially the whole of the iron and potassium content of the alunite will be dissolved and a fraction of the aluminum will be dissolved. In actual practice, I find that there is generally more aluminum dissolved than the chemical equivalent of the potassium, so that the solution can be regarded as containing potassium alum, aluminum sulfate and ferrous sulfate. It is essential that the iron present be retained in the ferrous condition, in order not to cause trouble in the subsequent crystallization of the alum from the liquor. I then separate the undissolved material from the dissolved material, and the liquor should be acid at this stage, and if the liquor is not substantially acid, a small additional amount of sulphuric acid can be added, to maintain the solution acid. I then evaporate until the solution is substantially saturated with potassium alum, and allow the solution to cool and allow the potassium alum to crystallize from the solution. This leaves ferrous sulfate and aluminum sulfate in solution and this solution can be worked up for producing a crude aluminum sulfate, by methods well known in the art.

The residue from the above preparation has been rendered free from iron by the extraction of with dilute acid, above described, and on further working up gives iron-free products, this preliminary extraction of iron from the main bulk of the alunite without much loss of alumina being the essence of the invention. The residue may be treated according to either one of two methods, and in the preferred method it is first roasted or heated in the air at a temperature of about 550° C., or slightly below this temperature (say about 500° C., or so), for an hour or so, which renders a part of the material soluble in water, and renders the entire aluminum content readily soluble in dilute sulphuric acid. The roasted material is then digested with sulfuric acid, of about 15% to 20% strength, for about 12 hours to one day and 90° to 105° C, and this operation can be conducted at atmospheric pressure.

In some cases the roasting operation may be omitted and the undissolved residue from the first operation can be treated with sulfuric acid, of a strength of about 50 to 75° Bé. for three or four days, at a temperature of about 110 to 120° C. In both of these latter operations, the amount of acid, relative to the amount of residue can be substantially varied, depending upon the richness of the alunite under treatment, but for ordinary purposes I find that about 21.5 to 25.0 parts of actual 100% sulfuric acid, can be used, per 100 pounds of the residue. The acid need not be concentrated, but acid from 20% to 60% is very satisfactory. This amount of acid will leave a little basic alumina in the finished product.

The solution obtained in either of the above processes consists essentially of aluminum sulfate, which is substantially free from iron, and which can be worked up into alum or aluminum sulfate, in the well known manner.

The avoidance of the use of pressure resisting containers, or autoclaves, for the digestion operation is a feature of very great importance, thereby greatly simplifying the plant, and removing all danger of explosion.

The entire process according to the present invention, can be economically performed, because the materials used are cheap and the amount of each necessary is relatively small, and no high temperature heating is necessary, except in the calcining operation, and this operation can be omitted if desired. The heat loss is only that due to radiation, which can be rendered exceedingly small.

I claim:—

1. Process of treating alunite which comprises digesting the same in the form of a fine powder with sulfuric acid of about 20% strength for about one or two days at not above 95° C., whereby practically all the potassium and iron contents and a part of the aluminum content are dissolved as sulfates, thereafter heating the undissolved residue from the above, with sulfuric acid at not over 120° C., until practically all the alumina has dissolved.

2. Process of treating alunite which comprises digesting the same in the form of a fine powder with sulfuric acid of about 20% strength for about one or two days at not above 95° C., whereby practically all the potassium and iron contents and a part of the aluminum content are dissolved as sulfates, heating the undissolved residue to about 500 to 550° C., to render it more readily amenable to sulfuric acid treatment, and thereafter heating this residue with sulfuric acid at not over 105° C., until practically all the alumina has dissolved.

3. In the treatment of alunite with sulfuric acid, the step of slow digestion of alunite in a finely powdered state with sulfuric acid, the acid being at no stage of the treatment over 75% strength, and said treatment being effected at substantially atmospheric pressure, throughout, and the amount of such acid being far less than the amount necessary to dissolve said alunite.

4. In the treatment of alunite with sulfuric acid, the step of slow digestion of alunite in a finely powered state with sulfuric acid, the acid being at no stage of the treatment substantially above 20% strength, and said treatment being effected at substantially atmospheric pressure, throughout, and the amount of such acid being far less than the amount necessary to dissolve said alunite.

5. In the treatment of alunite, the herein described process which comprises digesting alunite with hot dilute sulphuric acid, of such strength and in such amount as to dissolve practically the whole of the iron and potassium present, and to leave a residue of alumina-containing material which is soluble in hot sulphuric acid.

6. In the treatment of alunite, the herein described process which comprises digesting alunite with hot dilute sulphuric acid, of such strength and in such amount as to dissolve practically the whole of the iron and potassium present, and to leave a residue of alumina-containing material which is soluble in hot sulphuric acid and thereafter dissolving this residue in hot sulphuric acid to form a solution of aluminum sulphate substantially free from iron and potassium.

7. In the treatment of alunite, the herein described process which comprises digesting alunite with hot sulphuric acid of about 20% strength in such amount as to dissolve practically the whole of the iron and potassium present, and to leave a residue of alumina-containing material which is soluble in hot sulphuric acid.

8. In the treatment of alunite, the herein described process which comprises digesting 100 parts of alunite with 50 to 60 parts of 20% sulphuric acid, while substantially preventing evaporation from said mixture, to dissolve practically the whole of the iron and potassium present, and to leave a residue of alumina-containing material which is soluble in hot sulphuric acid.

In testimony whereof I affix my signature.

GEORGE S. TILLEY.